Patented Sept. 3, 1946

2,407,138

UNITED STATES PATENT OFFICE 2,407,138

CHEMICAL COMPOUNDS AND PREPARATION THEREOF

Albert M. Clifford and Joy G. Lichty, Stow, Ohio, assignors to Wingfoot Corporation, Akron, Ohio, a corporation of Delaware No Drawing. Application April 25, 1942, Serial No. 440,466

5 Claims. (Cl. 260—302)

This invention relates to the preparation of cyanoethyl thiazyl sulphides and derivatives thereof. More particularly, it includes as derivatives the amides and esters. The invention includes both the new compounds and the method of preparing the same.

According to this invention 2-mercaptothiazoles are combined with acrylonitriles by reaction in the presence of a catalyst. This forms cyanoethyl thiazyl sulphides. The process is illustrated by the following equation:

$$Th-SH + CH_2=CHCN \rightarrow Th-SCH_2CH_2CN$$

in which Th stands for the thiazyl group. The thiazyl group may be that derived from any thiazole such as, for example, 2-mercaptobenzothiazole, 2-mercapto-4-methyl thiazole, 2-mercapto-4-phenyl thiazole, or any 2-mercapto-naphthothiazole or any 2-mercapto benzothiazole, such as for example, 2-mercapto-5-methyl benzothiazole, 2-mercapto-6-methyl benzothiazole, 2-mercapto-4,6-dimethyl benzothiazole, 2-mercapto-4-methyl benzothiazole, 2-mercapto-4-methyl-6-chlor benzothiazole, 2-mercapto-6-ethoxy benzothiazole, 2-mercapto 6-nitro benzothiazole, and 2-mercapto-6-amino benzothiazole.

The following example is illustrative of the process:

A mixture of 125 grams of 2-mercaptobenzothiazole, 300 c. c. of acrylonitrile and 1.5 c. c. of 50% sodium hydroxide was heated to the refluxing temperature for one half hour. On cooling a total of 90 grams of solid separated. Evaporation of the filtrate gave a thick oil from which more crystals separated. Extraction of the residue with hot toluene gave 13.5 grams more of the product. Recrystallized from toluene, the beta cyanoethyl benzothiazyl sulphide thus obtained melted at 165° C.

Other catalysts may be used in carrying out the process. Suggested catalysts for this purpose are basic tertiary amines, sodium, sodium alcoholates, sodium mercaptides and KOH. Any elevated temperature, somewhat above or below the refluxing temperature, may be used.

If preferred, the excess mercaptothiazole may be separated from the reaction product with sodium hydroxide solution.

The nitriles thus obtained may be converted to amides, acids and esters. For example, the amide may be produced by acid hydrolysis with not more than one molecular proportion of water. For example, cyanoethylbenzothiazyl sulphide may be thus converted to amido ethyl benzothiazyl sulphide or beta (2-thio benzothiazyl) propionamide.

The corresponding acids may also be prepared by acid hydrolysis. For example, beta cyanoethyl benzothiazyl sulphide may be converted to carboxy ethyl benzothiazyl sulphide by acid hydrolysis with two or more molecular proportions of water. The acids thus produced may be esterified in any usual way. For example, the carboxy ethyl benzothiazyl sulphide may be converted to the ethyl ester or other ester by the action of the corresponding alcohol with a small amount of mineral acid as catalyst. The esters may also be prepared by the alcoholysis of cyanoethyl benzothiazyl sulphide in the presence of gaseous HCl. All esters may be produced including the alkyl esters, such as methyl, ethyl, butyl, allyl, furyl, etc.; the cyclo esters, such as the phenyl, naphthyl, benzyl, cyclohexyl, etc., any of which may contain a halogen or hydroxy group, etc. in the ring.

What we claim is:

1. The process of producing a 2-cyanoethyl 2-thiazyl sulphide which comprises condensing one mol of a 2-mercapto-thiazole with one mol of acrylonitrile in the presence of a catalyst.

2. The process of producing a 2-cyanoethyl 2-benzothiazyl sulphide which comprises condensing one mol of a 2-mercapto-benzo-thiazole with one mol of acrylonitrile in the presence of a catalyst.

3. As a new compound, a 2-cyanoethyl 2-thiazyl sulfide containing the molecular structure

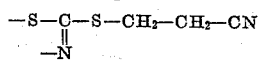

4. As a new compound, 2-cyanoethyl 2-benzothiazyl sulfide.

5. As a new compound, 2-cyanoethyl 2-naphthothiazyl sulfide.

ALBERT M. CLIFFORD.
JOY G. LICHTY.